US012764225B2

(12) United States Patent
Amin et al.

(10) Patent No.: US 12,764,225 B2
(45) Date of Patent: Oct. 13, 2026

(54) IDENTIFICATION OF CALL FLOW FAILURES IN A TELECOMMUNICATIONS NETWORK

(71) Applicant: T-Mobile USA, Inc., Bellevue, WA (US)

(72) Inventors: Rahul Amin, Issaquah, WA (US); Ashish Patel, Lynnwood, WA (US)

(73) Assignee: T-Mobile USA, Inc., Bellevue, WA (US)

(*) Notice: Subject to any disclaimer, the term of this patent is extended or adjusted under 35 U.S.C. 154(b) by 393 days.

(21) Appl. No.: 18/592,299

(22) Filed: Feb. 29, 2024

(65) Prior Publication Data

US 2025/0280066 A1 Sep. 4, 2025

(51) Int. Cl.
*H04M 3/22* (2006.01)

(52) U.S. Cl.
CPC .................................. *H04M 3/2218* (2013.01)

(58) Field of Classification Search
CPC .................................................... H04M 3/2218
USPC ........................................................ 455/414.1
See application file for complete search history.

(56) References Cited

U.S. PATENT DOCUMENTS 5,537,611 A 7/1996 Rajagopal et al.
5,638,430 A 6/1997 Hogan et al.
5,659,604 A 8/1997 Beckmann
5,999,616 A 12/1999 Fellner et al.
6,243,458 B1 6/2001 Fellner et al.
6,781,959 B1 8/2004 Garakani et al.
7,050,549 B2 5/2006 Hannigan
7,117,447 B2 10/2006 Cobb et al.
7,209,548 B2 4/2007 Ethier et al.
7,295,577 B2 11/2007 Moody et al.
7,397,905 B1 7/2008 Stewart et al.
7,420,927 B1 9/2008 Garakani et al.
7,564,953 B2 * 7/2009 Ethier ................. H04M 3/2254 379/32.01
7,610,514 B2 10/2009 Modani et al.
(Continued)

FOREIGN PATENT DOCUMENTS

CN 1479512 A 3/2004
CN 1312956 C 4/2007
(Continued)

*Primary Examiner* — Joel Ajayi
(74) *Attorney, Agent, or Firm* — Ashurst Perkins Coie US LLP

(57) ABSTRACT

A system for identifying call flow failures receives a call flow trace including a record of a call connected through multiple segments of a network. The system can identify a set of parameters associated with the multiple segments. The system can validate the call flow trace by matching the set of parameters with existing validation parameters. Responsive to successfully validating the call flow trace, the system can store information extracted from the validated call flow trace. Responsive to not successfully validating the call flow trace, the system can identify a particular segment of the multiple segments of the call associated with the trace that failed the validation and determine whether parameters associated with the particular segment match with existing failure parameters. In response to a determination that the parameters associated with the particular segment match the existing failure parameters, the system can remove information associated with the particular segment.

19 Claims, 6 Drawing Sheets

(56) References Cited

U.S. PATENT DOCUMENTS

| | | | |
|---|---|---|---|
| 7,778,393 | B2 | 8/2010 | Ethier et al. |
| 8,265,245 | B2 | 9/2012 | Hogan et al. |
| 8,359,584 | B2 | 1/2013 | Rao et al. |
| 8,406,412 | B2 | 3/2013 | Bethea et al. |
| 8,422,641 | B2 | 4/2013 | Martin |
| 8,839,420 | B2 | 9/2014 | Wibbeler |
| 9,277,431 | B1 | 3/2016 | Podolsky |
| 9,471,461 | B2 | 10/2016 | Rhee et al. |
| 9,535,814 | B2 | 1/2017 | Arora et al. |
| 9,584,662 | B2 | 2/2017 | Castillo et al. |
| 9,652,601 | B2 | 5/2017 | Zheng et al. |
| 9,661,035 | B2 | 5/2017 | Alexander et al. |
| 9,916,232 | B2 | 3/2018 | Voccio et al. |
| 10,165,457 | B2 | 12/2018 | Fernandez Arboleda et al. |
| 10,216,614 | B2 | 2/2019 | Alaranta et al. |
| 10,674,371 | B2 | 6/2020 | Hopcraft |
| 11,153,437 | B2 | 10/2021 | Downing et al. |
| 11,461,220 | B2 | 10/2022 | Slobodskoy et al. |
| 11,496,918 | B2 | 11/2022 | Amin et al. |
| 11,509,704 | B1 | 11/2022 | Menon et al. |
| 2002/0103899 | A1 | 8/2002 | Hogan et al. |
| 2004/0013253 | A1 | 1/2004 | Hogan et al. |
| 2023/0029818 | A1 | 2/2023 | Menon et al. |

FOREIGN PATENT DOCUMENTS

| | | | |
|---|---|---|---|
| CN | 101340602 | B | 12/2010 |
| CN | 102457624 | B | 9/2014 |
| CN | 101692726 | B | 3/2015 |
| CN | 103488570 | B | 9/2016 |
| CN | 107135206 | A | 9/2017 |
| CN | 104219316 | B | 3/2018 |
| CN | 109243591 | A | 1/2019 |
| CN | 107656999 | B | 6/2020 |
| CN | 111566624 | A | 8/2020 |
| CN | 112527421 | A | 3/2021 |
| CN | 112905568 | A | 6/2021 |
| CN | 112367321 | B | 11/2021 |
| CN | 113706299 | A | 11/2021 |
| CN | 110958267 | B | 1/2022 |
| CN | 111277578 | B | 2/2022 |
| DE | 112018007090 | T5 | 11/2020 |
| EP | 0873636 | A1 | 10/1998 |
| EP | 1022889 | A2 | 7/2000 |
| EP | 1036461 | A1 | 9/2000 |
| EP | 1425731 | A1 | 6/2004 |
| EP | 2057831 | B1 | 2/2013 |
| EP | 2612483 | A2 | 7/2013 |
| EP | 2443815 | B1 | 6/2014 |
| EP | 2948852 | A1 | 12/2015 |
| EP | 3126960 | A1 | 2/2017 |
| EP | 1466465 | B1 | 1/2018 |
| EP | 1791337 | B1 | 5/2020 |
| EP | 3389221 | B1 | 11/2021 |
| JP | H0774855 | A | 3/1995 |
| JP | H11512905 | A | 11/1999 |
| JP | 2002534872 | A | 10/2002 |
| JP | 6479844 | B2 | 2/2019 |
| JP | 6673047 | B2 | 3/2020 |
| JP | 6984710 | B2 | 11/2021 |
| KR | 100380410 | B1 | 4/2003 |
| KR | 100518081 | B1 | 9/2005 |
| KR | 200427095 | Y1 | 9/2006 |
| KR | 100828376 | B1 | 5/2008 |
| KR | 102306568 | B1 | 9/2021 |
| WO | 9712473 | A1 | 4/1997 |
| WO | 9917562 | A2 | 4/1999 |
| WO | 9929090 | A1 | 6/1999 |
| WO | 9955063 | A1 | 10/1999 |
| WO | 0145370 | A1 | 6/2001 |
| WO | 02101712 | A1 | 12/2002 |
| WO | 2006001987 | A2 | 1/2006 |
| WO | 2008021461 | A2 | 2/2008 |
| WO | 2008049813 | A1 | 5/2008 |
| WO | 2008109501 | A1 | 9/2008 |
| WO | 2010147721 | A1 | 12/2010 |
| WO | 2012000387 | A1 | 1/2012 |
| WO | 2012107112 | A1 | 8/2012 |
| WO | 2014117170 | A1 | 7/2014 |
| WO | 2015131434 | A1 | 9/2015 |
| WO | 2015153178 | A1 | 10/2015 |
| WO | 2016011739 | A1 | 1/2016 |
| WO | 2016090841 | A1 | 6/2016 |
| WO | 2016153967 | A1 | 9/2016 |
| WO | 2016161395 | A1 | 10/2016 |
| WO | 2017025773 | A1 | 2/2017 |
| WO | 2017139292 | A1 | 8/2017 |
| WO | 2018098191 | A1 | 5/2018 |
| WO | 2019158961 | A1 | 8/2019 |

* cited by examiner

IDENTIFICATION OF CALL FLOW FAILURES IN A TELECOMMUNICATIONS NETWORK

BACKGROUND

A call flow in a wireless telecommunication network includes a sequence of signaling and data interactions that occur when the network establishes a communication session initiated by a wireless device. In a typical call flow system, network function (NF) elements of a telecommunications network operate as consumers and/or producers of services. An NF element operating as a consumer invokes a service request to another NF element that is operating as a producer. The service request can be invoked using Hypertext Transfer Protocol (HTTP) and a Uniform Resource Identifier (URI) associated with the Application Programming Interface (API) of the service.

Even a basic call flow (e.g., a call flow for an audio call) can include a series of tens of such request-response interactions involving hundreds of information elements (IEs) (e.g., specific units of information within a request exchanged between the NF elements). Identifying call flow failures and resolving the identified failures is therefore a complex and time-consuming process. Identification of the call flow failures can be significant for, for example, optimizing network performance, diagnosing and preventing root causes of failures, and maintenance of service quality.

BRIEF DESCRIPTION OF THE DRAWINGS

Detailed descriptions of implementations of the present invention will be described and explained through the use of the accompanying drawings.

Figure 1:
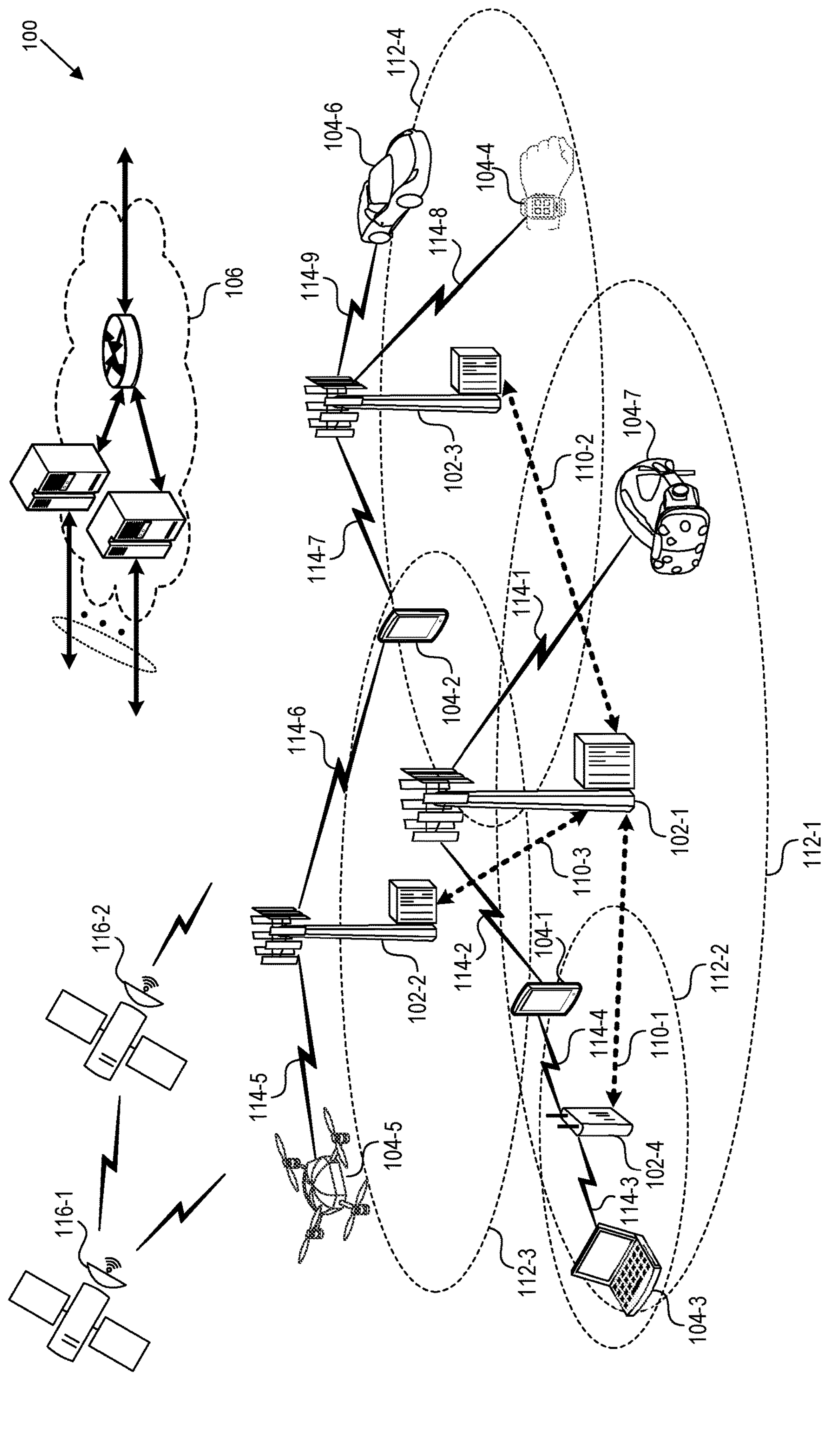
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to systems and methods for identifying call flow failures in a telecommunications network with improved efficiency and accuracy. The system can be used for identifying call flow segments that have caused a call flow failure based on parameters, such as response and request interaction and information elements associated with the call flow segments. Furthermore, the system can use an AI model that self-learns from successful and failed call flows to build the repository that can be used for identifying a call flow failure and predicting a solution for the failure. The disclosed technology involves building a repository (e.g., a call flow validation repository) storing information associated with successful call flows. The repository can be particularly useful for resolving recurring call flow failures.

Specifically, the disclosed technology includes processing real-time call flow traces to identify call flow failures. The processing includes comparing the call flow traces to the existing data stored in one or more databases based on the standardization of 5G system architecture (e.g., the 5G system architecture using the HTTP request-response messages for communication among NF elements) associated with call flow segments. When a failure has been identified and validated, the information associated with the call flow is stored in the call flow validation repository. When the failure has not been identified, an AI/machine learning algorithm is applied to predict the identification of the failure and the prediction can be stored in the call flow validation repository. The disclosed technology for identifying call flow failures reduces the complexity and size of data needed to be processed for identifying the call flow failures. Such reduction can lead to a significantly reduced processing time for identifying failures in NF-based standardized system architecture. The reduced processing time can lead to solving call flow failures faster therefore improving the user's experience with the network.

In one example, a system for identifying call flow failures in a telecommunications network receives a call flow trace by a call flow detection algorithm module of the system. The call flow trace can include a record of a call connected through multiple segments (e.g., call flow legs) of the telecommunications network. A call flow detection algorithm module of the system can identify a set of parameters associated with each respective segment of the multiple segments of the call associated with the call flow trace. A call flow validation module of the system can validate the call flow trace by matching the set of parameters for the respective segments with existing validation parameters from a call flow validation input database. The existing validation parameters can include information elements and service procedures associated with successful call flows. Responsive to successfully validating the call flow trace, a call flow validation repository of the system can store information extracted from the validated call flow trace. Responsive to not successfully validating the call flow trace, a call flow trace comparator module of the system can identify a particular segment of the multiple segments of the call associated with the trace that failed the validation. A call flow failure signature check module of the system can determine whether parameters associated with the particular segment match with existing failure parameters stored in a call flow failure signature database. In response to a determination that the parameters associated with the particular segment match the existing failure parameters, the system can remove information associated with the particular segment from the call flow validation repository.

In another example, a call flow detection algorithm module of the system can receive a call flow trace. The call flow trace can include a record of a call connected through at least one segment of the telecommunications network. The call flow detection algorithm module can identify a set of parameters associated with each respective segment of the at least one segment of the call associated with the call flow trace. A call flow validation module of the system can validate the call flow trace by matching the set of parameters for the respective segments with existing validation parameters from a call flow validation input database. The existing validation parameters can include information elements and service procedures associated with successful call flows. Responsive to successfully validating the call flow trace, a call flow validation repository of the system can store information extracted from the validated call flow trace.

In yet another example, a method for identifying call flow failures in a telecommunications network includes receiving a call flow trace by a call flow detection algorithm module. The call flow trace can include a record of a call connected through at least one segment of the telecommunications network. The method can include identifying a set of parameters associated with each respective segment of the at least one segment of the call associated with the call flow trace by the call flow detection algorithm module. The method can include validating the call flow trace by matching the set of parameters for the respective segments with existing validation parameters from a call flow validation input database by a call flow validation module. The existing validation parameters can include information elements and service procedures associated with successful call flows. Responsive to successfully validating the call flow trace, the method can include storing information extracted from the validated call flow trace by a call flow validation repository. Responsive to not successfully validating the call flow trace, the method can include identifying a particular segment of the at least one segment of the call associated with the trace that failed the validation by a call flow trace comparator module of the system. The method can include determining whether parameters associated with the particular segment match with existing failure parameters stored in a call flow failure signature storage location by a call flow failure signature check module of the system. In response to a determination that the parameters associated with the particular segment match the existing failure parameters, the method can include removing information associated with the particular segment from the call flow validation repository.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
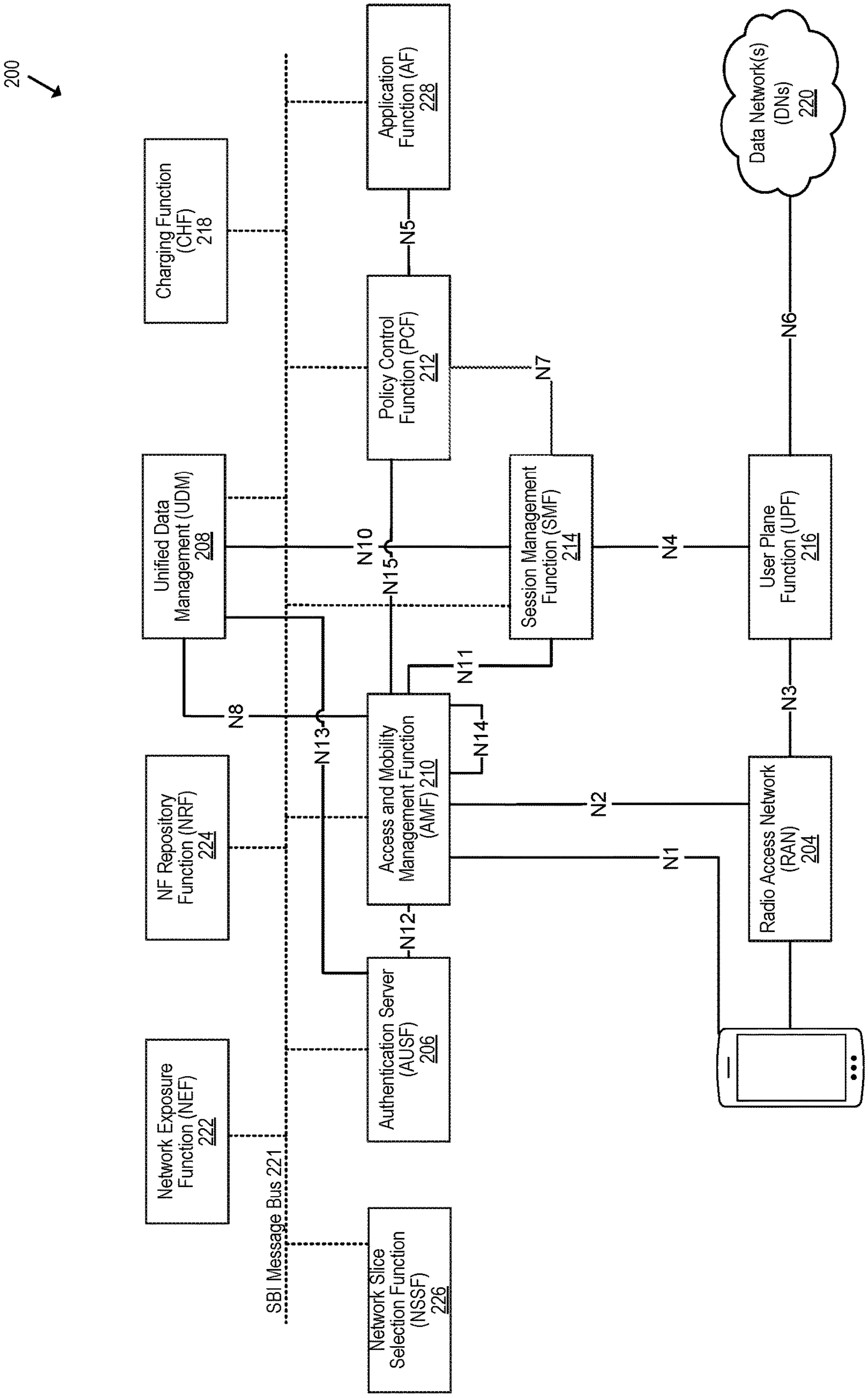
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Call Flow Failure Identification

Figure 3:
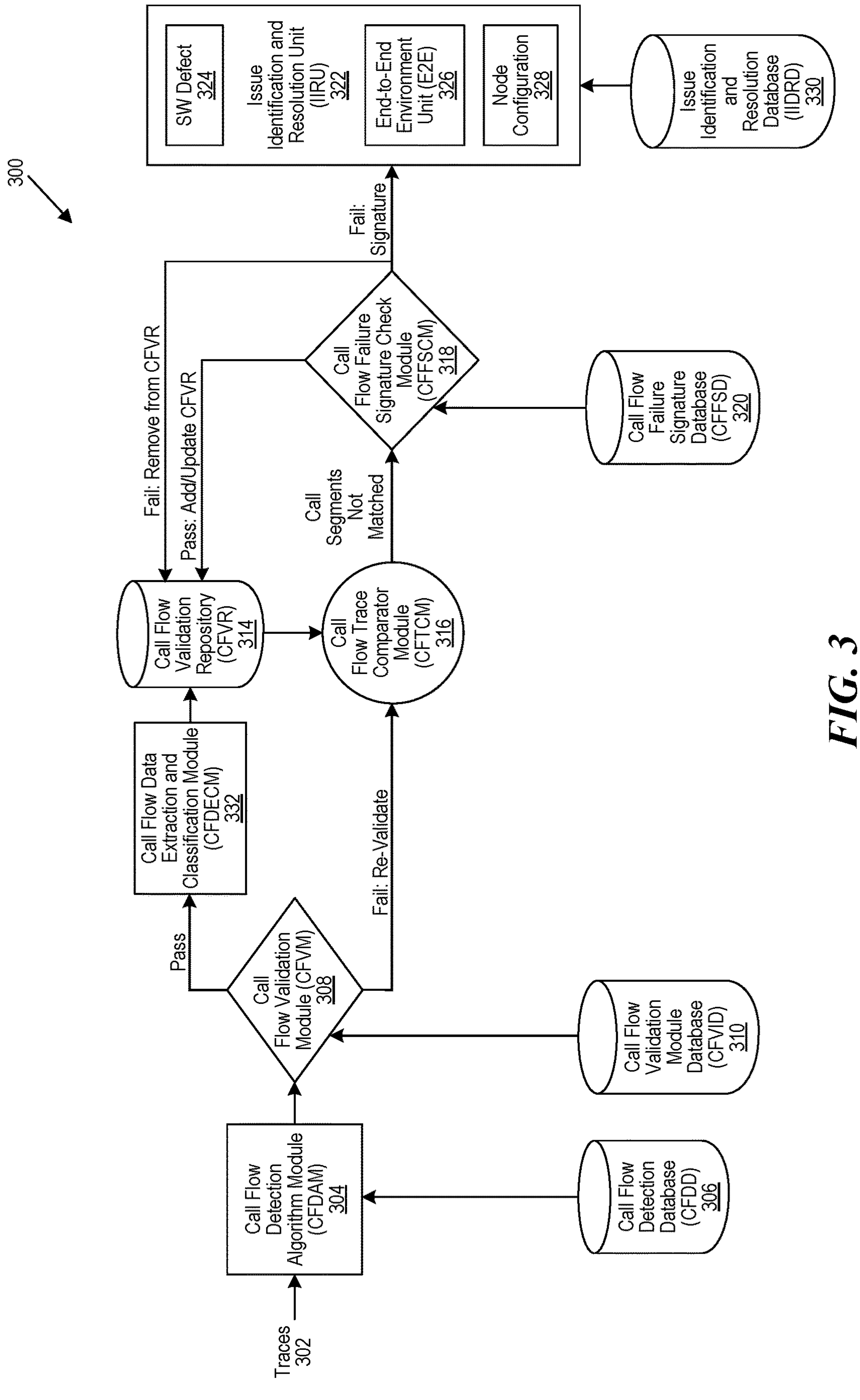
FIG. 3 is a block diagram that illustrates a system for identifying call flow failures according to some implementations of the present technology.

FIG. 3 is a block diagram that illustrates a system 300 for identifying call flow failures. The system 300 can be associated with a telecommunications network (e.g., the network 100 in FIG. 1) and a 5G system architecture (e.g., the architecture in FIG. 2). For example, the system 300 is configured to receive traces for call flows from the 5G system architecture and identify and resolve any failures associated with the traces. As used herein, a call flow trace refers to a detailed record of events and signaling messages that occur during the establishment, maintenance, and/or termination of a voice call. In some embodiments, the call flow trace can be associated with events that occur during other types of communication, such as video calls or messaging. The call flow trace can include information element (IE) values associated with the voice call. In particular, the call flow trace can include a record of a call connected through multiple segments of the telecommunications network. The IE values associated with the voice call can include configuration parameters, network capabilities, and quality of service (QoS) requirements associated with each of the multiple segments of the voice call.

The system 300 includes a call flow detection algorithm module (CFDAM) 304 and a call flow detection database (CFDD) 306 in communication with the CFDAM 304. The CFDAM 304 can be in communication with, or part of the 5G system architecture 200 described with respect to FIG. 2. For example, the CFDAM 304 can be implemented in one or more nodes of the 5G system architecture 200. As used throughout this disclosure, a database can be interchangeable with the term "storage location" or "repository." The CFDAM 304 is configured to receive call flow traces 302 from one or more nodes in the 5G system architecture 200. The CFDAM 304 can be configured to monitor, analyze, and troubleshoot the telecommunications network. For example, the CFDAM 304 includes one or more software and/or hardware components that analyze and interpret signaling messages within the telecommunications network to identify a sequence of events that occur during a voice call. The CFDD 306 is a database (or a repository or a storage location) that stores information (e.g., IE values) related to call flows. The information can include, for example, signaling messages, call parameters, and other relevant data for analysis by the CFDAM 304.

Table 1 illustrates exemplary information stored by the CFDD 306. The information in Table 1 includes parameters to identify the call flow. As shown, IEs listed in Table 1 include call flow identification (ID) information, call flow type, a service Uniform Resource Identifier (URI) or a message type, service URI specifics, packet identifier, request and response identifier, and IE validation information. The call flow types in Table 1 include 5G attach, 4G attach, Wi-Fi attach, Handover (HO) to LTE, or evolved packet system-function block (EPS-FB) initiated. The term "attach" can indicate that a device that has connected with a network was established, while "initiated" can indicate that a device is using the network. For example, "5G attached" signifies that the device has successfully connected to the 5G network, while "5G initiated" emphasizes that the device is now actively using the 5G services after completing the connection setup process. The call flow protocols (e.g., including procedures for establishment, management, and termination of a communication session) can include hypertext transfer protocol version 2 (HTTP2), packet forwarding control protocol (PFCP), general packet Radio service version 2 (GTPv2), session initiation protocol (SIP), diameter, domain name system (DNS), S1-C, and next-generation application protocol (NGAP). The service URI and Service URI specifics can provide information associated with the particular service associated with respective flow calls. Packet identifier includes information for identifying and categorizing packets based on their characteristics. Request and response identifiers identify whether the respective call flow was associated with a requester or a replier. The IE validation can provide information about whether the IE elements associated with the respective call flow are validated against predefined rules and standards. As an example, for call flow identification (ID) number 1, the IE validation element "requesttype:INITIAL_REQUEST, ratType:NR" identifies the request type for the call flow as an initial 5G session attached request.

TABLE 1

Exemplary information stored at CFDD

| Call Flow ID | Call Flow Type | PROTOCOL | Service URI or Message Type | Service URI Specifics | Service Method | PACKET IDENTIFIER | REQUEST/ RESPONSE | IE VALIDATION |
|---|---|---|---|---|---|---|---|---|
| 1 | 5G Attach | HTTP2 | /nsmf-pdusession/v1/sm-contexts | | | supi:imsi-310310995000749, requestType: INITIAL_REQUEST | Request | supi:imsi-310310995000749, requestType: INITIAL_REQUEST, ratType:NR, dnn:ims |
| 2 | 4G Attach | WS-FILTER | Request Create Session | | | | | gtpv2.message_type == 32, e212.imsi == 310310995000328, gtpv2.rat_type == 6 |
| 3 | WIFI Attach | WS-FILTER | Create Session Request | | | | | gtpv2.message_type == 32, e212.imsi == 310310995000328, gtpv2.rat_type == 3 |
| 4 | HO to LTE | WS-FILTER | Create Session Request | | | | | gtpv2.message_type == 32, e212.imsi == 310310995000328, gtpv2.rat_type == 6, gtpv2.hi == 1 |
| 5 | EPS-FB Initiated | HTTP2 | /nsmf-pdusession/v1/sm-contexts | imsi-310310140000144 | modify | | Request | upCnxState: DEACTIVATED, value:41 |

The CFDAM 304 can compare the information associated with the received flow call traces against the information stored at the CFDD 306. Based on the comparison, the CFDAM 304 is configured to identify a set of IEs (e.g., parameters) associated with respective segments of the call associated with the call flow trace.

The system 300 can include a call flow validation module (CFVM) 308 and a call flow validation module database (CFVID) 310. The CFVM 308 is configured to verify and validate the correctness and integrity of the call setup. For example, the CFVM 308 can analyze whether the telecommunications network operates in accordance with specified standards and configurations. The CFVID 310 is a database that stores IE values and service procedures that are associated with successful call flows. The CFVM 308 can analyze the validity of the flow call trace by comparing the information associated with the call flow trace with existing validation IE values stored at the CFVID 310. The validation can be performed for all sequences of the flow call. Table 2 illustrates existing values for successful call flow traces that are associated with a particular call flow ID (e.g., the call flow ID No. 5 from Table 1).

TABLE 2

Exemplary information stored at a CFVID

| Call Flow ID | Call Flow Type | PROTOCOL | Type Service URI or Message | Service URI Specifics | Service Method | PACKET IDENTIFIER | REQUEST/ RESPONSE | IE VALIDATION |
|---|---|---|---|---|---|---|---|---|
| 5 | EPS-FB: 5G Attach | HTTP2 | /nsmf-pdusession/v1/sm-contexts | | | supi:imsi-310310140000144 | Request | supi:imsi-310310140000144, requestType: INITIAL_REQUEST, ratType:NR, dnn:ims |
| 5 | EPSFB: Resource Setup Fails | HTTP2 | /nsmf-pdusession/v1/sm-contexts | imsi-310310140000144 | modify | n2SmInfoType: PDU_RES_MOD_FAIL | Request | n2SmInfo Type: PDU_RES_MOD_FAIL |
| 5 | EPSFB:EPSFB Initiated | HTTP2 | pdusession/v1/sm- | 310310140000144 | modify | | Request | upCnxState: DEACTIVATED, value:41 |
| 5 | e | HTTP2 | pdusession/v | 3103101400 | retrieve | | | |
| 5 | EPSFB: MBReq | WS-FILTER | Modify Bearer Request | | | | | gtpv2.message_type == 34, gtpv2.ebi == 5, gtpv2.rat_type == 6 |
| 5 | EPSFB:MBResp | WS-FILTER | Modify Bearer Response | | | | | gtpv2.message_type == 35, gtpv2.ebi == 5, gtpv2.cause == 16 |
| 5 | EPSFB:CBReq | WS-FILTER | Create Bearer Request | | | | | gtpv2.message_type == 95, gtpv2.ebi == 5 |
| 5 | EPSFB: CBResp | WS-FILTER | Response Create Bearer | | | | | gtpv2.message_type == 96, gtpv2.ebi == 6, gtpv2.cause == 16 |

The system 300 includes a call flow data extraction and classification module (CFDECM) 332 and a call flow validation repository (CFVR) 314. The CFDECM 332 is configured to receive traces validated by the CFVM 308. The CFDECM 332 can extract procedures and IE values from the call flow traces that the CFVM 308 matched during the validation and add the extracted procedures and IE values to the CFVR 314. The CFVR 314 is configured to store information associated with successful flow calls. The information stored at the CFVR 314 can be used for the identification of call flow failures and solving the identified call flow failures. Information can be added to, and removed from, the CFVR 314 by different components of the system 300.

The system 300 includes a call flow trace comparator module (CFTCM) 316. The CFTCM 316 is configured to receive traces not validated by the CFVR 314 from the CFVR 314 (e.g., the trace validation failed). The CFTCM 316 is configured to perform a revalidation on the traces failed to be validated by the CFVR 314. For example, the CFTCM 316 retrieves information associated with successful traces from the CFVR 314 and compares that information with respective segments of the failed call flow trace. The CFTCM 316 can thereby identify segments of the flow call that caused the failed validation of the call flow. In an instance that the information for the respective segments of the call flow trace does not match with the successful traces from the CFVR, the CFTCM 316 can transmit the call flow trace to a call flow failure signature check module (CFFSCM) 318 of the system 300.

The CFFSCM 318 is in communication with a call flow failure signature database (CFFSD) 320, as well as the CFVR 314. The CFFSD 320 is configured to include information of call flow segments that have been identified as failed (e.g., existing failure parameters). In particular, the CFFSD 320 can include a unique combination of parameters for a particular segment that has been identified as a failed segment. In some implementations, the information of the failed call flow segments is manually entered into the CFFSD 320. The unique combination of parameters for a particular segment that has been identified as a failed segment can be referred to as a failure signature. A failure signature can include one or more of the call flow applicable parameters included in Table 3. In some implementations, the failure signature includes a timestamp identifying the time and date of the failed segment. Table 3 illustrates exemplary information stored at the CFFSD 320 (e.g., for the call flow ID No. 5 from Tables 1 and 2).

TABLE 3

Exemplary information stored at the CFFSD

| Call Flow ID | Call Flow Type | PROTOCOL | Service URI or Message Type | Service URI Specifics | Service Method | PACKET IDENTIFIER | REQUEST/ RESPONSE | IE VALIDATION |
|---|---|---|---|---|---|---|---|---|
| 5 | EPS-FB Mapped EPS | HTTP2 | /nudm-sdm/v2 | | | supi:imsi-310310140000144 | Request | |

TABLE 3-continued

| Exemplary information stored at the CFFSD | | | | | | | | | |
|---|---|---|---|---|---|---|---|---|---|
| Call Flow ID | Call Flow Type | PROTOCOL | Service URI or Message Type | Service URI Specifics | Service Method | PACKET IDENTIFIER | REQUEST/ RESPONSE | IE VALIDATION |
| 5 | Bearer Failure: 5G Subscription Fetch EPS-FB Mapped EPS Bearer Failure: 5G Subscription Fetch | HTTP2 | /nudm-sdm/v2 | | | supi:imsi-310310140000144 | Response | NOT (iwkEpsInd:true) |

The CFFSCM 318 is configured to generate a signature for a respective segment of the call flow trace received from the CFTCM 316 and determine (e.g., by comparing) whether the signature matches with failure signatures stored at the CFFSD 320. In an instance that the signature matches with the failure signatures (i.e., the associated call flow segment has been identified as failed), the system 300 can remove the information associated with the respective segment from the CFVR 314. In an instance that the signature does not match with the failure signatures (i.e., the associated call flow segment has not been identified as failed), the system 300 can add the information associated with the respective segment to the CFVR 314 or, alternatively, for example, update the information stored at the CFVR 314 based on the determination made by the CFFSCM.

In some implementations, the CFFSCM 318 and/or the CFFSD 320 operate based on an AI model (e.g., an ML model). For example, the CFFSCM 318 and/or the CFFSD 320 include an AI system (e.g., an AI system 600 described with respect to FIG. 6). The CFFSCM 318 can be configured to apply machine learning (ML) techniques to identify (classify) the signature and predict whether the signature would be associated with the failure signatures or not.

The system 300 can further include an issue identification and resolution unit (IIRU) 322. The IIRU 322 can further include, or be in communication with, one or more software modules for identifying and resolving call flow failures. The resolving can involve software-related testing and verifying. For example, the IIRU 322 can include a software defect unit (SW defect) 324, an end-to-end environment unit (E2E) 326, and a node configuration unit (Node Configuration) 328. The SW defect 324 can be configured to evaluate and verify that a software application does what it is supposed to do without defects (e.g., bugs). The E2E 326 can be configured to test and verify the functionality and performance of an entire software application from start to finish. The testing can involve simulating real-world user scenarios and replicating live data. The node configuration 328 can be configured to manage the configuration of a system and resolve any issues associated with the configuration.

The IIRU includes or is in communication with an issue identification and resolution database (IIDRD) 330 that is configured to include information associated with issues or problems that arise within the operation of the 5G architecture. The IIDRD 330 can be configured to keep records of issues, categorize and classify the issues, track progress for resolving issues, and report and analyze issues of the 5G architecture.

Figure 4:
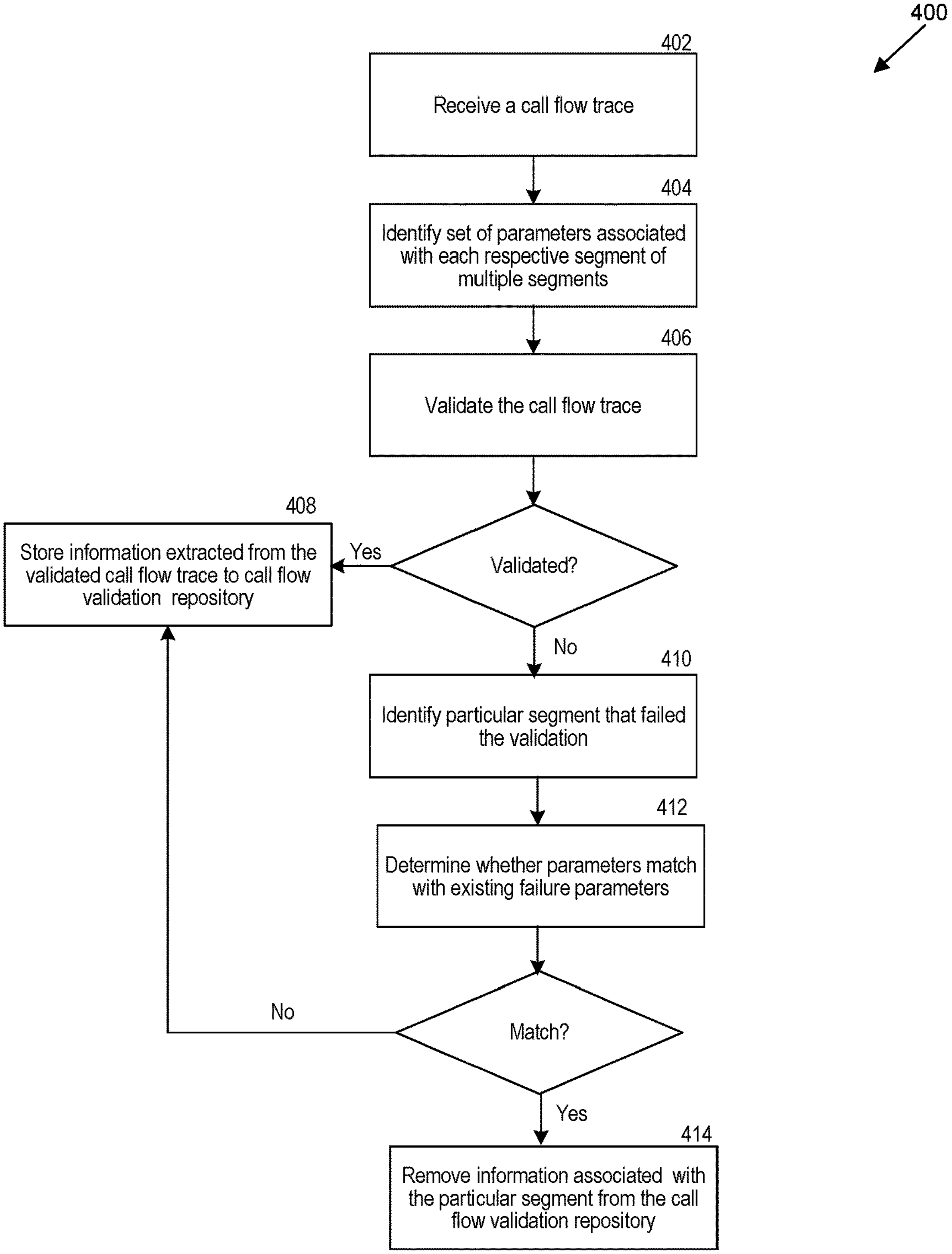
FIG. 4 is a flow diagram that illustrates a process for identifying call flow failures in a telecommunications network according to some implementations of the present technology.

FIG. 4 is a flow diagram that illustrates a process 400 for identifying call flow failures in a telecommunications network. The process 400 can be performed by a system (e.g., the system 300 in FIG. 3) associated with a wireless network (e.g., the wireless network 100 in FIG. 1). The server system can be associated with a telecommunications network and include at least one hardware processor and at least one non-transitory memory storing instructions (e.g., a computer system 500 described with respect to FIG. 5). When the instructions are executed by the at least one hardware processor, the server system performs the process 400. The process 400 is directed for identifying call flow failures in a telecommunications network by building a repository (e.g., the CFVR 314 in FIG. 4) storing information associated with successful flow calls. In particular, the process 400 can use an AI model for self-learning from successful and failed call flows to build the repository. The repository can be particularly useful for resolving recurring call flow failures efficiently and accurately.

In particular, the process 400 includes processing of real-time call flow traces using existing databases to detect call flow failures. This involves comparing the call flow traces to the existing databases based on the standardization of 5G system architecture, specifically using HTTP request-response messages for communication among NF elements associated with call flow segments. Identified and validated call flow information can be stored in the call flow validation repository. Additionally, an AI/ML algorithm can be applied to predict the identification of the failure for such failures that could not be identified based on a direct comparison to existing data. The process 400 can reduce the amount of data processing required for identifying call flow failures, resulting in a significantly reduced processing time for identifying failures.

At 402, the system can receive a call flow trace by a CFDAM of the system (e.g., the CFDAM 304 in FIG. 3). The call flow trace can include a record of a call connected through multiple segments of the telecommunications network.

At 404, the system can identify a set of parameters associated with each respective segment of the multiple segments of the call associated with the call flow trace by the CFDAM. The identifying is performed by the CFDAM. Identifying the set of parameters for the respective segments of the multiple segments by CFDAM can include matching (e.g., identifying corresponding parameters) the parameters including service messages and IE values associated with the respective segments to entries in a call flow detection database (e.g., the CFVID 310). As used in this disclosure, matching can refer to exact correspondence between different parameters or having a correspondence between the different parameters within a threshold range. For example, two parameters can be considered as matching if the parameters are within a threshold range from each other. The threshold range can be, e.g., 5%, 10%, or 20% variance of exact correspondence.

In some implementations, identifying the set of parameters for the respective segments of the multiple segments by the CFDAM includes identifying one or more of a call flow type, a call flow protocol, a service message type, or an information validation value. Exemplary service messages and IE values are illustrated in Table 1 above. After identifying the set of parameters, the CFDAM can transmit the identified parameters along with the voice call trace to a CFVM (e.g., the CFVM 308) for validation.

At 406, the system can validate the call flow trace by matching the set of parameters for the respective segments with existing validation parameters from a CFVID (e.g., the CFVID 310 in FIG. 3) by a CFVM (e.g., the CFVM 308 in FIG. 3). As used herein, validating a call flow can involve confirming that the parameters associated with the respective segments of the call flow associated with the received call flow trace meet the specified requirements of, for example, setting up, managing, and terminating a call flow. The existing validation parameters can include information elements and service procedures associated with successful call flows. Exemplary information stored at a CFVID for a particular call flow ID is illustrated in Table 2 above. In an instance that the set of parameters for the respective segments matches (e.g., within a threshold correspondence) with the existing validation parameters at the CFVID, the CFVM determines that the call flow trace meets the requirements for a successful call flow (e.g., validates the call flow trace). In an instance that the set of parameters for the respective segments does not match with the existing validation parameters at the CFVID, the CFVM determines that the call flow trace did not meet the requirements for a successful call flow (e.g., validates the call flow trace).

At 408, responsive to successfully validating the call flow trace, the system can store information extracted from the validated call flow trace by a CFVR (e.g., the CFVR 314 in FIG. 3). The information extracted from the validated call flow trace can include the information elements and service procedures matched against the parameters. The CFVR can store information associated with successful flow calls. The information stored at the CFVR can be used for the identification of call flow failures and solving the identified call flow failures.

In some implementations, prior to storing the information extracted from the validated call flow trace, the validated call flow trace is processed by a CFDECM to extract the information from the call flow trace (e.g., the CFDECM 332 in FIG. 3). For example, the CFDECM operates on the validated call flow trace using the service procedures included in the CFVID (e.g., Table 2) to identify and extract all the service procedures and IEs of the validated call flow trace that were matched by the CFVM.

At 410, responsive to not successfully validating the call flow trace, the system can identify a particular segment of the multiple segments of the call associated with the trace that failed the validation. The identification can be performed by a CFTCM (e.g., the CFTCM 316 in FIG. 3) of the system. For example, the CFVM transmits the call flow trace that failed the validation by the CFVM to the CFTCM. The CFTCM can revalidate the call flow trace. The revalidation can include retrieving parameters associated with successful traces from the CFVR and comparing the parameters for the respective segments of the call flow trace with successful traces from the CFVR. The revalidation can be used to identify the particular segment of the multiple segments that caused the voice call trace to fail the validation at the CFVM.

In an instance that the parameters for the respective segments of the call flow trace do not match with the successful traces from the CFVR, the system can transmit the call flow trace to a CFFSCM (e.g., the CFFSCM 318 in FIG. 3). In particular, the CFTCM can identify a particular segment that fails the revalidation and transmit the information associated with the failing particular segment to the CFFSCM.

At 412, the system can determine whether parameters associated with the particular segment match with existing failure parameters stored in a CFFSD (e.g., the CFFSD 320 in FIG. 3). The determination can be performed by a CFFSCM of the system. Determining whether parameters associated with the particular segment match with existing failure parameters stored in the CFFSD can include generating a signature associated with the particular segment. The signature can include a timestamp identifying a time that the particular segment in the call flow trace failed and the parameters associated with the particular segment. The timestamp for the particular segment can be extracted, for example, from the call flow trace (e.g., from log data associated with flow call segments of the flow call trace). The existing failure parameters stored in the CFFSD can include timestamps associated with failed call flows. The determining can include comparing the timestamp identifying a time that the particular segment in the call flow trace failed to the timestamps of the existing failure parameters. For example, in Table 3 for call flow ID number 3, a call flow failure is detected based on the IE validation element "NOT (iwkEpsInd:true). For example, CFFSCM identifies a time period (e.g., 1 minute or 5 minutes) that is around the timestamp in the signature associated with the particular segment to filter the existing failure parameters stored in the CFFSD. The filtering can significantly reduce the size of the CFFSD data that needs to be analyzed against the parameters associated with the particular segment, thereby reducing the time required to do the analyses.

At 414, in response to a determination that the parameters associated with the particular segment match the existing failure parameters, the system can remove information associated with the particular segment from the CFVR. For example, removing the information associated with a particular segment from the CFVR includes transmitting instructions by the CFFSCM to the CFVR to remove the information. In response to a determination that the parameters associated with the particular segment do not match the existing failure parameters, the system can add the information associated with the particular segment to the CFVR. For example, the CFFSCM sends instructions to the CFVR to add the parameters associated with the particular segment to the CFVR. Alternatively, the CFFSCM can update the respective CFVR entry based on the determination by the CFFSCM that the parameters associated with the particular segment are to be stored at the CFVR.

In some implementations, the determination of whether the parameters associated with the particular segment match with parameters of existing failure parameters stored in a CFFSD is performed based on an AI model for identifying call flow failures. For example, the CFFSCM and/or the CFFSD operate based on an AI model that is trained to predict the identification of call flow failures. The prediction by the AI model can significantly increase the efficiency of identifying the call flow failures compared to non-AI model approaches, thereby reducing the time for resolving an issue causing a failure of a segment of a call flow. Increasing the efficiency has significance given the complex nature of call flows within a wireless network. Since a call flow (e.g., a call flow for an audio call) can include a series of tens of request-response interactions involving hundreds of IEs (e.g., specific units of information within a request exchanged between the NF elements), the amount of data entries to analyze for purpose of identifying call flow failures is significantly high. Using the described AI model for the identification of flow call failures can help to identify and thereby resolve segment failures with reduced time in particular for reoccurring flow call failures.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the AI model for identifying call flow failures can be a neural network with multiple input nodes that receive the parameters associated with the particular segment as an input. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as a prediction for identifying the call flow failure. In some implementations, such neural networks, known as deep neural networks, can have multiple layers of intermediate nodes with different configurations and can be a combination of models that receive different parts of the input and/or input from other parts of the deep neural network or are convolutions-partially using output from previous iterations of applying the model as further input to produce results for the current input.

An ML model can be trained with supervised learning, where the training data includes parameters associated with failed flow call segments and corresponding parameters identified as a reason for the failures as input and a desired output, such as a resolution of the reason for the failures. A representation of the resolution can be provided to the model. Output from the model can be compared to the desired output for that resolution, and based on the comparison, the model can be modified, such as by changing weights between nodes of the neural network or parameters of the functions used at each node in the neural network (e.g., applying a loss function). After applying each of the resolutions for the failures in the training data and modifying the model in this manner, the model can be trained to evaluate new failed flow call segments.

Here, the CFFSCM can be trained to identify (e.g., classify) call flow segments that have failed based the parameters associated with the call flow segments. The training data can include flow call traces that have in the past been identified to include failed segments and an identity for the failure. The trained AI model of the CFFSCM then receives the parameters associated with the particular segment from the CFTCM and predicts, based on the trained model and the failure data included in the CFFSD, whether the particular segment would match the existing failure parameters in the CFFSD.

In some implementations, in response to a determination that the parameters associated with the particular segment match the existing failure parameters, the system transmits the information associated with the particular segment to an IIRU (e.g., the IIRU in FIG. 3). The system can analyze the information associated with the particular segment to identify a cause for the failure of the particular segment. The analyzing can include testing and verifying the information associated with the particular segment by one or more software modules for identifying and resolving call flow failures (e.g., the SW defect 324, E2E 326, and/or node configuration 328). The system can identify an action to correct the failure of the particular segment based on the identified cause. An IIDRD (e.g., the IIDRD 330 in FIG. 3) can be configured to keep records of issues, categorize and classify the issues, track progress for resolving issues, and report and analyze issues of the 5G architecture. In some implementations, when the IIRU has identified and resolved a cause for the failure of the particular segment, the information of the particular segment can be communicated to the CFVR 314 to be stored.

Computer System

Figure 5:
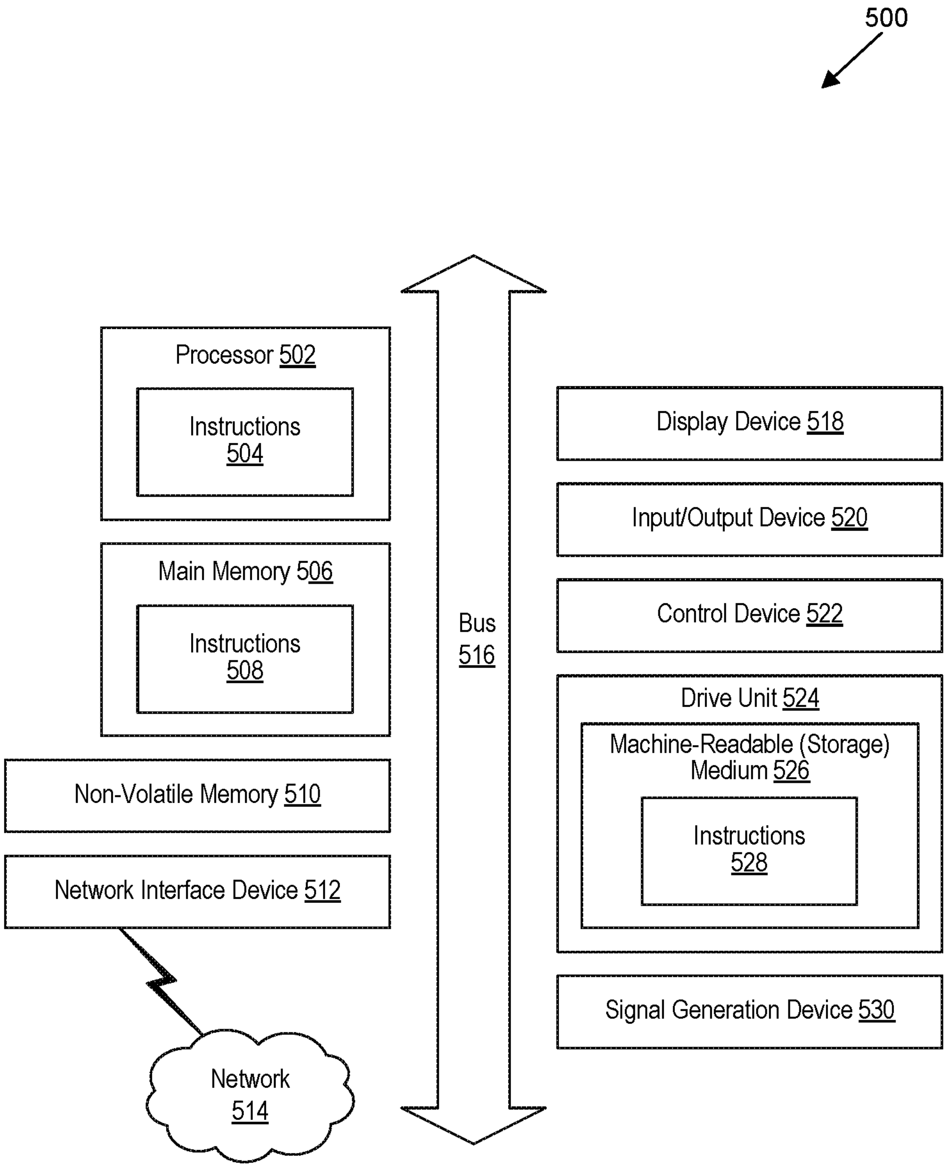
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

AI System

Figure 6:
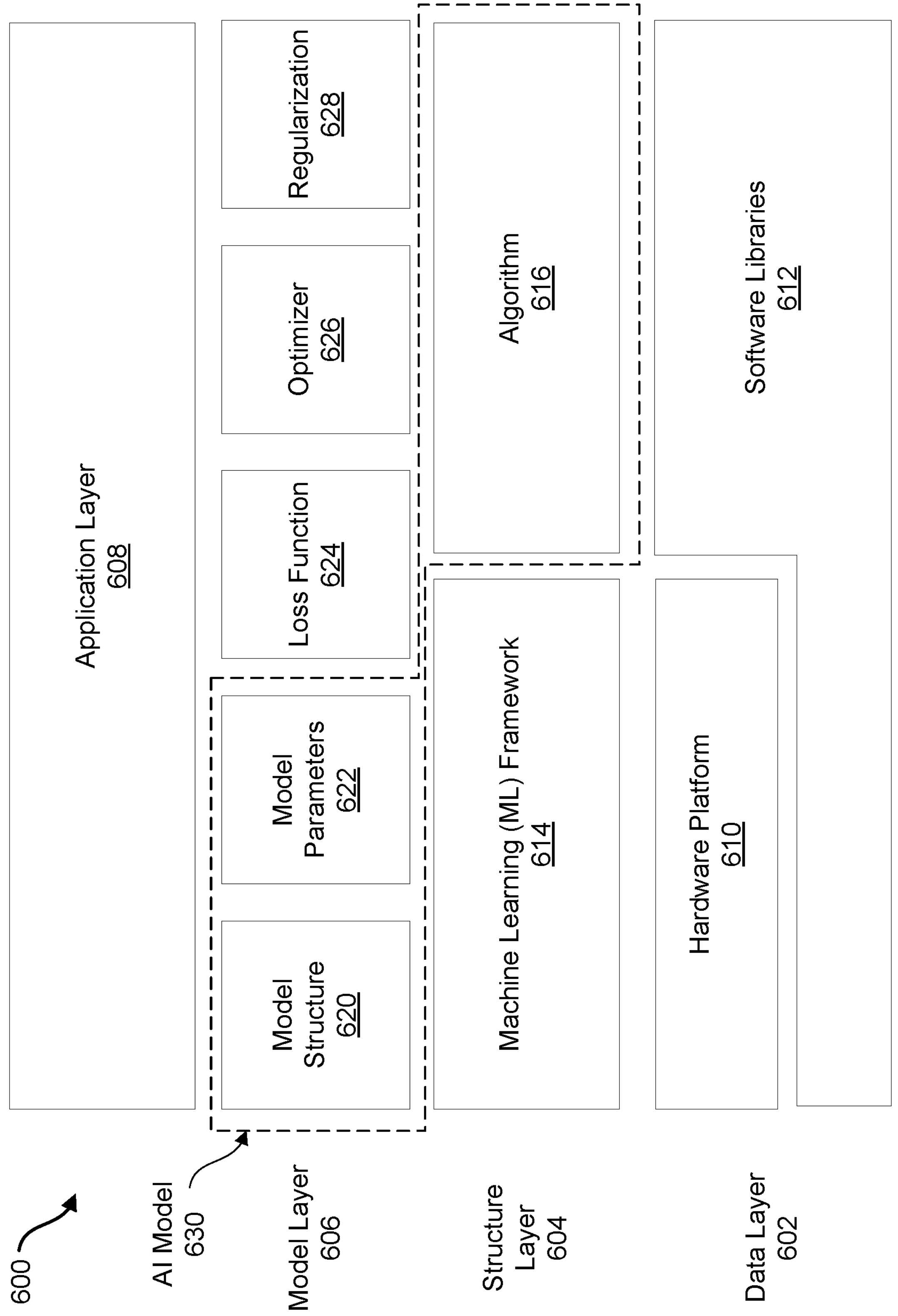
FIG. 6 is a block diagram that illustrates an example of an artificial intelligence (AI) system in which at least some operations described herein can be implemented.

FIG. 6 is a block diagram that illustrates an example of an AI system 600 in which at least some operations described herein can be implemented. As shown, the AI system 600 can include a set of layers, which conceptually organize elements within an example network topology for the AI system's architecture to implement a particular AI model 630. Generally, an AI model 630 is a computer-executable program implemented by the AI system 600 that analyzes data to make predictions. Information can pass through each layer of the AI system 600 to generate outputs for the AI model 630. The layers can include a data layer 602, a structure layer 604, a model layer 606, and an application layer 608. The algorithm 616 of the structure layer 604 and the model structure 620 and model parameters 622 of the model layer 606 together form the example AI model 630. The optimizer 626, loss function engine 624, and regularization engine 628 work to refine and optimize the AI model 630, and the data layer 602 provides resources and support for the application of the AI model 630 by the application layer 608.

The data layer 602 acts as the foundation of the AI system 600 by preparing data for the AI model 630. As shown, the data layer 602 can include two sub-layers: a hardware platform 610 and one or more software libraries 612. The hardware platform 610 can be designed to perform operations for the AI model 630 and include computing resources for storage, memory, logic, and networking, such as the resources described in relation to FIG. 5. The hardware platform 610 can process amounts of data using one or more servers. The servers can perform backend operations such as matrix calculations, parallel calculations, machine learning (ML) training, and the like. Examples of servers used by the hardware platform 610 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 610 can include Infrastructure as a Service (IaaS) resources, which are computing resources (e.g., servers, memory, etc.), offered by a cloud services provider. The hardware platform 610 can also include computer memory for storing data about the AI model 630, application of the AI model 630, and training data for the AI model 630. The computer memory can be a form of random-access memory (RAM), such as dynamic RAM, static RAM, and non-volatile RAM.

The software libraries 612 can be thought of as suites of data and programming code, including executables, used to control the computing resources of the hardware platform 610. The programming code can include low-level primitives (e.g., fundamental language elements) that form the foundation of one or more low-level programming languages, such that servers of the hardware platform 610 can use the low-level primitives to carry out specific operations. The low-level programming languages do not require much, if any, abstraction from a computing resource's instruction set architecture, allowing them to run quickly with a small memory footprint.

The structure layer 604 can include an ML framework 614 and an algorithm 616. The ML framework 614 can be thought of as an interface, library, or tool that allows users to build and deploy the AI model 630. The ML framework 614 can include an open-source library, an Application Programming Interface (API), a gradient-boosting library, an ensemble method, and/or a deep learning toolkit that work with the layers of the AI system to facilitate the development of the AI model 630. For example, the ML framework 614 can distribute processes for the application or training of the AI model 630 across multiple resources in the hardware platform 610. The ML framework 614 can also include a set of pre-built components that have the functionality to implement and train the AI model 630 and allow users to use pre-built functions and classes to construct and train the AI model 630. Thus, the ML framework 614 can be used to facilitate data engineering, development, hyperparameter tuning, testing, and training for the AI model 630.

The algorithm 616 can be an organized set of computer-executable operations used to generate output data from a set of input data and can be described using pseudocode. The algorithm 616 can include complex code that allows the computing resources to learn from new input data and create new/modified outputs based on what was learned. In some implementations, the algorithm 616 can build the AI model 630 through being trained while running computing resources of the hardware platform 610. This training allows the algorithm 616 to make predictions or decisions without being explicitly programmed to do so. Once trained, the algorithm 616 can run at the computing resources as part of the AI model 630 to make predictions or decisions, improve computing resource performance, or perform tasks. The algorithm 616 can be trained using supervised learning, unsupervised learning, semi-supervised learning, and/or reinforcement learning.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system for identifying call flow failures in a telecommunications network, the system comprising:

at least one hardware processor; and at least one non-transitory memory storing instructions, which, when executed by the at least one hardware processor, cause the system to:

receive, from one or more 5G core network functions associated with the telecommunications network, by a call flow detection algorithm module of the system, a call flow trace, wherein the call flow trace includes a record of a call connected through multiple segments of the telecommunications network;

identify, by the call flow detection algorithm module, a set of parameters associated each respective segment of the multiple segments of the call associated with the call flow trace, wherein the set of parameters comprises values for a first set of information elements (IEs) selected from: a call flow identification (ID), call flow type, a service Uniform Resource Identifier (URI), a message type, service URI specifics, a packet identifier, a request and response identifier, or an information element (IE) validation information;

validate, by a call flow validation module of the system, the call flow trace by matching the set of parameters for the respective segments with existing validation parameters from a call flow validation input database, wherein the existing validation parameters include values for a second set of IEs and service procedures associated with historical successful call flows, wherein the second set of IEs includes one or more IEs from the first set of IEs, wherein the service procedures identify call flow protocols used for management of the historical successful call flows, and wherein the matching comprises comparing the set of parameters for the respective segments with the existing validation parameters to identify whether the set of parameters for the respective segments and the existing validation parameters are within a threshold range of each other;

responsive to successfully validating the call flow trace, extract, by a call flow validation repository, information from the validated call flow trace, wherein the information extracted from the validated call flow trace comprises values of the existing validation parameters and service procedures matched against the set of parameters;

store, by the call flow validation repository, the information extracted from the validated call flow trace; and responsive to not successfully validating the call flow trace, identify, by a call flow trace comparator module of the system, a particular segment of the multiple segments of the call associated with the trace that failed the validation, determine, by a call flow failure signature check module of the system, that parameters associated with the particular segment match with existing failure parameters stored in a call flow failure signature database, and in response to a determination that the parameters associated with the particular segment match the existing failure parameters, remove, by the call flow failure signature check module of the system, information associated with the particular segment from the call flow validation repository.

2. The system of claim 1, wherein the call flow validation repository comprises information associated with successful flow calls, and wherein the call flow validation repository is for identification of call flow failures and solving the identified call flow failures.

3. The system of claim 1, wherein the system is further caused to:

in response to a determination that the parameters associated with the particular segment do not match the existing failure parameters, add the information associated with the particular segment to the call flow validation repository.

4. The system of claim 1, wherein the system is further caused to:

in response to a determination that the parameters associated with the particular segment match the existing failure parameters, transmit the information associated with the particular segment to an issue identification and resolution database, analyze the information associated with the particular segment to identify a cause for the failure of the particular segment, and identify, based on the identified cause, an action to correct the failure of the particular segment.

5. The system of claim 1, wherein the determination of whether the parameters associated with the particular segment match with parameters of existing failure parameters stored in a call flow failure signature database is performed based on an artificial intelligence (AI) model.

6. The system of claim 1, wherein identifying, by the call flow detection algorithm module, the set of parameters for the respective segments of the multiple segments comprises:

matching the set of parameters for the respective segments to entries in a call flow detection database, wherein the set of parameters for the respective segments comprises service messages and information element values associated with the respective segments.

7. The system of claim 1, wherein identifying, by the call flow detection algorithm module, the set of parameters for the respective segments comprises identifying one or more of:

a call flow type, a call flow protocol, a service message type, or an information validation value.

8. The system of claim 1, wherein the information extracted from the validated call flow trace is processed by a call flow data extraction and classification module, and wherein the information extracted from the validated call flow trace comprises the information elements and service procedures matched against the parameters.

9. The system of claim 1, wherein the system is further caused to:

in an instance that the call flow trace is not validated, revalidate, by a call flow trace comparator module of the system, the call flow trace by:

retrieving parameters associated with successful traces from the call flow validation repository, compare the parameters for the respective segments of the call flow trace with successful traces from the call flow validation repository, and in an instance that the parameters for the respective segments of the call flow trace do not match with the successful traces from the call flow validation repository, transmit the call flow trace to the call flow failure signature check module of the system.

10. The system of claim 1, wherein removing the information associated with the particular segment from the call flow validation repository comprises transmitting instructions, by the call flow failure signature check module, to the call flow validation repository to remove the information.

11. The system of claim 1, wherein determining, by the call flow failure signature check module of the system, whether the set of parameters for the respective segments matches with existing failure parameters stored in the call flow failure signature database comprises:

generating a signature associated with the particular segment, wherein the signature includes a timestamp identifying a time that the particular segment in the call flow trace failed and the set of parameters for the respective segments, and wherein the existing failure parameters stored in the call flow failure signature database include timestamps, and comparing the timestamp identifying a time that the particular segment in the call flow trace failed to the timestamps of the existing failure parameters.

12. At least one non-transitory, computer-readable storage medium comprising instructions recorded thereon, wherein the instructions, when executed by at least one data processor of a system for identifying call flow failures in a telecommunications network, cause the system to:

receive, from one or more 5G core network functions associated with the telecommunications network, by a call flow detection algorithm module of the system, a call flow trace, wherein the call flow trace includes a record of a call connected through at least one segment of the telecommunications network;

identify, by the call flow detection algorithm module, a set of parameters associated each respective segment of the at least one segment of the call associated with the call flow trace, wherein the set of parameters comprises values for a first set of information elements (IEs) selected from: a call flow identification (ID), call flow type, a service Uniform Resource Identifier (URI), a message type, service URI specifics, a packet identifier, a request and response identifier, or an information element (IE) validation information;

validate, by a call flow validation module of the system, the call flow trace by matching the set of parameters for the respective segments with existing validation parameters from a call flow validation input database, wherein the existing validation parameters include values for a second set of IEs and service procedures associated with historical successful call flows, wherein the second set of IEs includes one or more IEs from the first set of IEs, wherein the service procedures identify call flow protocols used for management of the historical successful call flows, and wherein the matching comprises comparing the set of parameters for the respective segments with the existing validation parameters to identify whether the set of parameters for the respective segments and the existing validation parameters are within a threshold range of each other;

responsive to successfully validating the call flow trace, extract, by a call flow validation repository, information from the validated call flow trace, wherein the information extracted from the validated call flow trace comprises values of the existing validation parameters and service procedures matched against the set of parameters;

store, by the call flow validation repository, information extracted from the validated call flow trace; and responsive to not successfully validating the call flow trace, identify, by a call flow trace comparator module of the system, a particular segment of the multiple segments of the call associated with the trace that failed the validation, determine, by a call flow failure signature check module of the system, that parameters associated with the particular segment match with existing failure parameters stored in a call flow failure signature database, and in response to a determination that the parameters associated with the particular segment match the existing failure parameters, remove, by the call flow failure signature check module of the system, information associated with the particular segment from the call flow validation repository.

13. The at least one non-transitory, computer-readable storage medium claim 12, wherein the system is further caused to:

in an instance that the call flow trace is not validated, re-validate, by a call flow trace comparator module of the system, the call flow trace by:

retrieving parameters associated with successful traces from the call flow validation repository, comparing the parameters for the respective segments of the call flow trace with successful traces from the call flow validation repository, and in an instance that the parameters for the respective segments of the call flow trace do not match with the successful traces from the call flow validation repository, transmit the call flow trace to the call flow trace comparator module of the system.

14. The at least one non-transitory, computer-readable storage medium of claim 12, wherein the call flow validation repository comprises information associated with successful flow calls, and wherein the call flow validation repository can be used for identification of call flow failures and solving the identified call flow failures.

15. The at least one non-transitory, computer-readable storage medium of claim 12, wherein the information extracted from the validated call flow trace is processed by a call flow data extraction and classification module, and wherein the information extracted from the validated call flow trace comprise the information elements and service procedures matched against the parameters.

16. A method for identifying call flow failures in a telecommunications network, the method comprising:

receiving, from one or more 5G core network functions associated with the telecommunications network, by a call flow detection algorithm module, a call flow trace, wherein the call flow trace includes a record of a call connected through at least one segment of the telecommunications network;

identifying, by the call flow detection algorithm module, a set of parameters associated each respective segment of the at least one segment of the call associated with the call flow trace, wherein the set of parameters comprises values for a first set of information elements (IEs) selected from: a call flow identification (ID), call flow type, a service Uniform Resource Identifier (URI), a message type, service URI specifics, a packet identifier, a request and response identifier, or an information element (IE) validation information;

validating, by a call flow validation module, the call flow trace by matching the set of parameters for the respective segments with existing validation parameters from a call flow validation input database, wherein the existing validation parameters include values for a second set of IEs and service procedures associated with historical successful call flows, wherein the second set of IEs includes one or more IEs from the first set of IEs, wherein the service procedures identify call flow protocols used for management of the historical successful call flows, and wherein the matching comprises comparing the set of parameters for the respective segments with the existing validation parameters to identify whether the set of parameters for the respective segments and the existing validation parameters are within a threshold range of each other;

responsive to successfully validating the call flow trace, extract, by a call flow validation repository, information from the validated call flow trace, wherein the information extracted from the validated call flow trace comprises values of the existing validation parameters and service procedures matched against the set of parameters;

storing, by the call flow validation repository, the information extracted from the validated call flow trace; and responsive to not successfully validating the call flow trace, identifying, by a call flow trace comparator module of the system, a particular segment of the at least one segment of the call associated with the trace that failed the validation, determining, by a call flow failure signature check module of the system, that parameters associated with the particular segment match with existing failure parameters stored in a call flow failure signature storage location, and in response to a determination that the parameters associated with the particular segment match the existing failure parameters, removing, by the call flow failure signature check module of the system, information associated with the particular segment from the call flow validation repository.

17. The method of claim 16, wherein the call flow validation repository comprises information associated with successful flow calls, and wherein the call flow validation repository is for identification of call flow failures and solving the identified call flow failures.

18. The method of claim 16, further comprising:

in response to a determination that the parameters associated with the particular segment do not match the existing failure parameters, adding the information associated with the particular segment to the call flow validation repository; and in response to a determination that the set of parameters for the respective segments matches the existing failure parameters, transmitting the information associated with the particular segment to an issue identification and resolution database, analyzing the information associated with the particular segment to identify a cause for the failure of the particular segment, and identifying, based on the identified cause, an action to correct the failure of the particular segment.

19. The method of claim 16, wherein the determination of whether the parameters associated with the particular segment match with parameters of existing failure parameters stored in a call flow failure signature database is performed based on an artificial intelligence (AI) model.

* * * * *